C. RATHERT.
BALL BEARING.
APPLICATION FILED AUG. 10, 1911.

1,066,149.

Patented July 1, 1913.

WITNESSES:

INVENTOR
Carl Rathert

UNITED STATES PATENT OFFICE.

CARL RATHERT, OF CHICAGO, ILLINOIS.

BALL-BEARING.

1,066,149.  Specification of Letters Patent.  Patented July 1, 1913.

Application filed August 10, 1911. Serial No. 643,302.

*To all whom it may concern:*

Be it known that I, CARL RATHERT, a citizen of the United States, and residing at Chicago, in the county of Cook and State of Illinois, have invented a new and useful Improvement in Ball-Bearings, of which the following is a complete specification.

The main objects of this invention are to provide an improved ball bearing; to provide a ball bearing in which the friction of the parts is reduced to a minimum; to provide a ball bearing having a retainer of very cheap and simple construction which is adapted to have the smallest possible contact with the balls; and to provide a ball bearing having a retainer adapted to be used with either single or double raceways.

Figure 1:
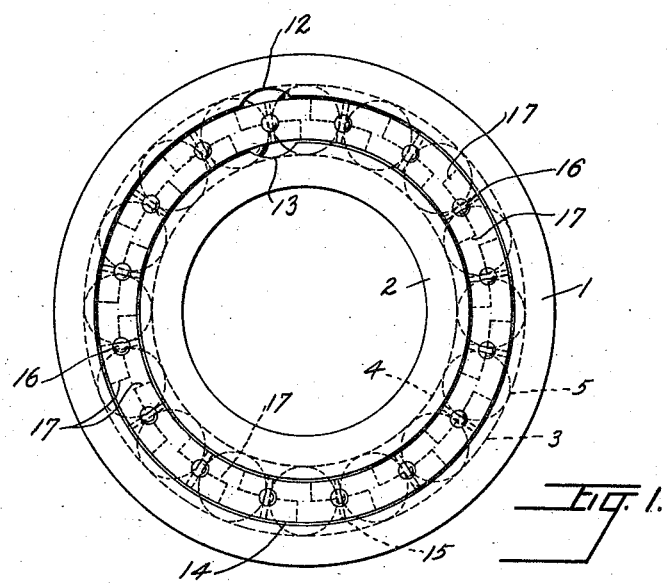
Figure 2:
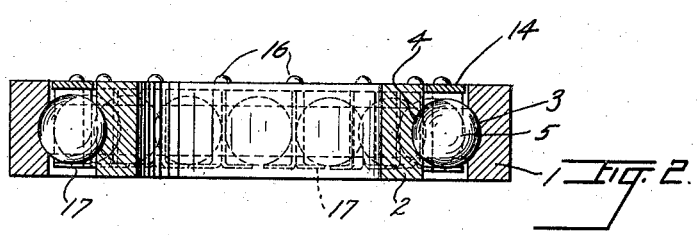
Figure 3:
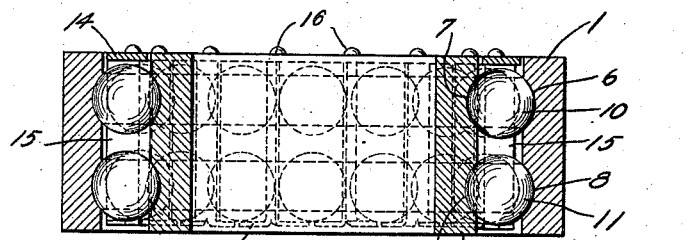
Figures 4, 5:
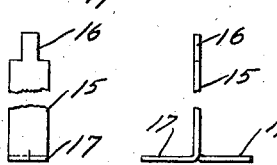

A specific embodiment of the invention is illustrated in the accompanying drawings, in which:

Figure 1 is a side elevation of a ball bearing embodied in this invention. Fig. 2 is a section of the bearing having a single raceway. Fig. 3 is a section of the bearing having a double raceway. Fig. 4 is a fragmentary front elevation of one of the spacer plates. Fig. 5 is a fragmentary side elevation of said plate.

In the construction shown, the outer and inner bearing rings 1 and 2 are provided in their adjacent faces with grooves 3 and 4, respectively, which form the raceway for the balls 5 of the single raceway bearing shown in Fig. 2, or with grooves 6 and 7, and 8 and 9, which form the raceways for the balls 10 and 11 in the double raceway bearing, shown in Fig. 3. The bearing rings 1 and 2 are provided with notches 12 and 13, respectively, which lead into the raceways, and which, when in register with each other, afford access for the balls to the raceway.

The retainer comprises a retaining ring 14 having a plurality of equally spaced apertures therethrough and adapted to be inserted between the bearing rings 1 and 2, at one edge thereof, and a plurality of spacer plates 15, one of which is inserted between each two adjacent balls. Each of said spacer plates comprises a strip of thin, strong metal, having one end reduced in size to provide a lug or rivet 16 adapted to extend through one of the apertures of the retainer ring and be riveted or headed over. The other or free end of each plate 15 is split or forked to provide two prongs 17 which are turned or directed oppositely from each other circumferentially of the retainer ring to overlap the adjacent ball on each side of the plate and hold the retainer in place. In the double raceway bearing the plates are identical in shape with those for the single raceway bearing except that they are of sufficient length to project past both sets of balls and have their prongs 17 engage the balls of the set farthest removed from the ring 14. Inasmuch as the plates are made of very thin metal they occupy but a small amount of space thereby permitting approximately 95% of the raceway to be filled with balls. Furthermore the contact surface between the balls and the plates is reduced to a minimum, thereby reducing the friction to a minimum.

While I have shown and described but one specific embodiment of the invention it will be understood that many details of the construction shown may be varied or omitted without departing from the scope of the claim.

I claim:

A ball bearing, comprising concentric bearing rings having one or more raceways therebetween, balls in said raceways, a retainer ring at one side of said raceways and adjacent said balls and provided with circumferentially spaced apertures, and a plurality of single, flat, radially arranged spacer plates attached to and projecting from said ring between said balls, said plates being provided with narrowed ends which extend through said apertures in the retainer ring and are rigidly secured therein; the opposite ends of said plates being split and the parts thereof being bent oppositely and directed circumferentially of the retainer ring to engage the next adjacent ball on each side of the spacer plate.

In witness whereof I have hereunto subscribed my name in the presence of two witnesses.

CARL RATHERT.

Witnesses:
 C. R. WALKER,
 W. A. SWAREN.

Copies of this patent may be obtained for five cents each, by addressing the "Commissioner of Patents, Washington, D. C."